US009235265B2

(12) United States Patent
Karamath et al.

(10) Patent No.: US 9,235,265 B2
(45) Date of Patent: Jan. 12, 2016

(54) TOUCH-SCREEN DEVICE INCLUDING TACTILE FEEDBACK ACTUATOR

(75) Inventors: James Robert Karamath, Morelos (MX); Christopher James Brown, Oxford (GB); Sergio Garcia Castillo, Oxford (GB); Harry Garth Walton, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 683 days.

(21) Appl. No.: 13/474,195

(22) Filed: May 17, 2012

(65) Prior Publication Data

US 2013/0307789 A1 Nov. 21, 2013

(51) Int. Cl.
*G06F 3/01* (2006.01)

(52) U.S. Cl.
CPC ..................... *G06F 3/016* (2013.01)

(58) Field of Classification Search
CPC ........................................................ G06F 3/016
See application file for complete search history.

(56) References Cited

U.S. PATENT DOCUMENTS

| 7,218,310 B2 * | 5/2007 | Tierling et al. ............... 345/156 |
| 2010/0085169 A1 | 4/2010 | Poupyrev et al. |
| 2010/0152794 A1 * | 6/2010 | Radivojevic et al. ............. 607/2 |

FOREIGN PATENT DOCUMENTS

WO 2009/141502 11/2009

OTHER PUBLICATIONS

Mallinckrodt et al.; "Perception by the Skin of Electrically Induced Vibrations"; Science vol. 118 (No. 3062); Sep. 4, 1953; pp. 277-278.

* cited by examiner

*Primary Examiner* — Kenneth B Lee, Jr.
(74) *Attorney, Agent, or Firm* — Renner, Otto, Boisselle & Sklar, LLP

(57) ABSTRACT

A tactile feedback actuator includes a first electrode and a second electrode separated by a gap, and a surface layer above the first and second electrodes. The first electrode receives a first stimulus voltage at a first frequency and the second electrode receives a second stimulus voltage at a second frequency, and the first and second electrodes superimpose the first and second stimulus voltages to generate a total voltage that has a beat frequency less than a perception threshold frequency. An object in contact with a portion of the surface layer is caused to vibrate at the beat frequency. The first electrode and the second electrode may constitute an electrode array including a plurality of column electrode segments, and a plurality of row electrode segments. An object in contact with a portion of the surface layer above one or more electrode segments is caused to vibrate at the beat frequency.

17 Claims, 15 Drawing Sheets

TOUCH-SCREEN DEVICE INCLUDING TACTILE FEEDBACK ACTUATOR

TECHNICAL FIELD

The invention relates to a tactile feedback device, and more specifically to a tactile feedback actuator that can reproduce tactile sensations at specific and multiple locations on a device surface in response to a user input. The invention further relates to a structure and control means to generate tactile sensations through electro-vibrations of the user's skin.

BACKGROUND ART

With touch-screen and touch-display devices (collectively referred to herein as "touch-screen devices") rapidly growing in popularity, one significant shortcoming over traditional methods of data-entry has quickly become evident. The lack of tactile sensations perceived by the user when pressing "virtual" buttons on the touch-screen—the feelings of button edges and depressing the button for example—necessitates extra concentration by the user, who must visually confirm the position of their finger(s) relative to the display and then check they have correctly entered the data after each action. Real buttons and keys help divide the mental effort amongst the senses with the sense of touch helping to limit the workload on the visual sensory system. It has been shown that data entry using virtual buttons, as opposed to traditional physical buttons, causes an increase in data entry error rates and a decrease in user satisfaction due to the lack of such realistic tactile sensations.

In conventional touch-screen devices, such touch-screen devices may be enhanced through the addition of a means to artificially create tactile sensations, a feature known as tactile feedback. For example, when the user touches the touch-screen in a location corresponding to that of a virtual button, a tactile feedback device may stimulate the user's finger to artificially re-create the sensation of touching a physical button.

An exemplary method to reproduce tactile sensations is to stimulate one's sense of touch through vibrations, or oscillatory motions, of the surface of the device in contact with the user's finger. The generated vibrations may be in a direction normal to the plane of the surface (herein normal motion) or in a direction along the plane of the touch-screen (herein lateral motion). Since the skin is essentially insensitive to the direction of the vibrating motion, either direction of motion is effective in reproducing tactile sensations.

Given that a touch-screen surface on a mobile device is typically formed by a single continuous piece of material—for example, glass or plastic—the sensations caused by mechanical vibrations are limited to the generation of a single tactile sensation across the entire surface. That is, the entire screen vibrates at once thus sending the same tactile signal to all the user's fingers regardless of their position on the device and regardless of whether providing feedback to all fingers is appropriate or not.

Another method of applying tactile stimuli to a touch-screen is with a technique known as electro-vibration. A tactile feedback device employing this technique typically includes a conductive layer just below its surface (insulated from the user) to which a periodic voltage signal of a large magnitude is applied. The user's skin is then periodically attracted toward the display by electrostatic forces which can be perceived by the user as tactile sensations. This principal of electro-vibration method was described in Mallinckrodt et al, SCIENCE 118(3062) 277, dated Sep. 4, 1953, and application of this method to tactile feedback devices is described in MÄKINEN, V. et al., WO2009141502, dated Nov. 26, 2009, and POUPYREV, I. et al., US20100085169, dated Apr. 8, 2010. Furthermore, it is known that by dividing up the conductive layer into separately addressable electrode segments, each electrode segment may be independently controlled to create a touch feedback device that permits independent tactile feedback sensations to be generated at specific and multiple locations. However, the use of electrode segments suffers from the disadvantage that it is necessary to independently address all segments. As a result, a large number of connections is required, and a significant proportion of the device surface area must be devoted to the wiring used for addressing. The electrode segment method is therefore not suitable for creating a tactile feedback device with a high spatial resolution.

A tactile feedback device based on a form of electro-vibration is also described in RADIVOJEVIC, Z. et al., US20100152794, dated Jun. 17, 2010. The device described therein may be addressed in such a manner as to permit independent tactile feedback sensations to be generated at specific and multiple locations across the device. To achieve this effect, rows and columns have certain positive or negative voltages applied to them. Only above the electrodes which mark the intersection of a row carrying a positive voltage and a column carrying a negative voltage (or vice versa), is a tactile sensation felt by the user. At other locations, only the positive or negative voltage signals exist and nothing is felt by the user. Such a method relies on the existence of a voltage threshold below which the human skin cannot sense the tactile signal. However, this voltage threshold may vary between users and depend on environmental conditions, thus leading to unreliable performance of the device.

SUMMARY OF INVENTION

An apparatus and method for creating an electro-vibration type tactile feedback device that is capable of generating independent tactile feedback sensations at specific and multiple locations across the surface of the device is disclosed. The integration of such a device with a touch-screen device is further disclosed. The disclosed tactile feedback device includes a novel tactile electrode array and a novel method of applying high voltage driving signals that together enable the generation of tactile feedback sensations at specific and multiple locations across the device.

The tactile feedback device disclosed herein incorporates a tactile feedback actuator, which includes an array of electrodes patterned into rows and columns to which high voltage periodic signals of defined frequency are applied. The actuator may utilize an electro-vibration method to generate vibrations in the user's skin that are perceived as tactile sensations.

The applied voltage signals may be arranged individually such that any signal alone does not generate a perceptible tactile sensation, and in pairs such that a pair may produce a perceptible tactile signal. For example, each signal applied to the electrode array may have a frequency beyond a perception frequency, $f_t$, of the human mechanoreceptor sensory system (~1000 Hz). However, a pair of signals may combine to create frequency components below the perception frequency, as occurs due to the beating phenomenon. That is, when signals of frequency $f_1$ and $f_2$ with a frequency difference, $\Delta f$, less than the perception frequency (i.e. $\Delta f = f_1 - f_2 < f_t$) are sent to neighboring electrodes, the skin vibrates at the beat frequency of these signals and is thus perceived by the user as a tactile sensation. The electrodes may be designed such that only in certain locations on the surface of the device can such signals occur on adjacent, or co-located, electrodes, for example, as are associated with an intersecting column and row electrode. The regions of tactile stimuli are therefore discrete and localized to one or more defined areas on the surface of the device. By arranging pairs of signals in this way it is possible to generate independent tactile feedback sensations at specific and multiple locations across the surface of the device, i.e. "multi-touch" tactile sensations can be produced.

Advantageously, the design of such an electrode array allows the multi-touch capability to be created by using a relatively small number of addressing circuits. Furthermore, the frequency detection bandwidth does not significantly vary between users or environmental conditions and provides a more reliable operation of the device than the conventional methods described in the prior art.

Accordingly, aspects of the invention include a tactile feedback actuator. The tactile feedback actuator includes a first electrode and a second electrode separated by a gap, and a surface layer above the first and second electrodes. The first electrode receives a first stimulus voltage at a first frequency and the second electrode receives a second stimulus voltage at a second frequency, and the first and second electrodes are arranged such that the first and second stimulus voltages superimpose to generate a total voltage that has a beat frequency less than a perception threshold frequency. The beat frequency is within a range to generate a tactile sensation at a portion of the surface layer.

According to one embodiment of the tactile feedback actuator, at least one of the first and second frequencies of the first and second stimulus voltages is greater than the perception threshold frequency.

According to one embodiment of the tactile feedback actuator, the beat frequency is a difference between the first frequency and the second frequency.

According to one embodiment of the tactile feedback actuator, the perception threshold frequency is less than 1000 Hz.

According to one embodiment of the tactile feedback actuator, the gap is less than least 2 mm.

According to one embodiment of the tactile feedback actuator, the first electrode and the second electrode form an electrode array. The first electrode includes a plurality of column electrodes that each includes a plurality of column electrode segments, and the second electrode includes a plurality of row electrodes that each includes a plurality of row electrode segments. The beat frequency is within a range to generate a tactile sensation at a portion of the surface layer above one or more of the column and row electrode segments.

According to one embodiment of the tactile feedback actuator, each column electrode and each row electrode is separately addressable with a respective voltage stimulus. At least one column electrode receives the first stimulus voltage at the first frequency and at least one row electrode receives the second stimulus voltage at the second frequency. A first region of tactile feedback is formed at an intersection of the column electrode that receives the first stimulus voltage and the row electrode that receives the second stimulus voltage such that the first and second stimulus voltages superimpose within the region to generate a first total voltage that has a first beat frequency. The beat frequency is within a range to generate a tactile sensation at a portion of the surface layer above the first region.

According to one embodiment of the tactile feedback actuator, the first region of tactile feedback includes at least one column electrode segment and one row electrode segment.

According to one embodiment of the tactile feedback actuator, at least one other column electrode receives a third stimulus voltage at a third frequency and at least one other row electrode receives a fourth stimulus voltage at a fourth frequency. A second region of tactile feedback is formed at an intersection of the column electrode that receives the third stimulus voltage and the row electrode that receives the fourth stimulus voltage such that the third and fourth stimulus voltages superimpose within the second region to generate a second total voltage that has a second beat frequency. The second beat frequency is within a range to generate a tactile sensation at a portion of the surface layer above the second region.

According to one embodiment of the tactile feedback actuator, the second region of tactile feedback includes at least one column electrode segment and one row electrode segment.

According to one embodiment of the tactile feedback actuator, a superposition of the first voltage and the fourth voltage, or a superposition of the second voltage and the third voltage, results in a total voltage that is greater than the perception threshold frequency.

According to one embodiment of the tactile feedback actuator, each column electrode segment and each row electrode segment includes multiple fingers such that each column electrode segment is inter-digitated with a respective row electrode segment.

According to one embodiment of the tactile feedback actuator, the tactile feedback actuator further includes a plurality of averaging electrodes. Each averaging electrode overlaps at least one column electrode segment and one row electrode segment, and the averaging electrode generates an averaging voltage by superimposing the first and second voltages to generate the total voltage at the beat frequency. The beat frequency is within a range to generate a tactile sensation at a portion of the surface layer above the averaging electrode.

According to one embodiment of the tactile feedback actuator, a fifth stimulus voltage having a fifth frequency less than the perception threshold frequency is applied to at least one other of the plurality of column electrodes or the plurality of row electrodes. The fifth frequency is within a range to produce a tactile sensation at a portion of the surface layer above the one other column electrode or row electrode.

According to one embodiment of the tactile feedback actuator, stimulus voltages applied to adjacent column electrodes or row electrodes are of opposite phase.

According to one embodiment of the tactile feedback actuator, the tactile feedback actuator further includes a flexible substrate containing the electrode array including the first and second electrodes, a common ground electrode formed on a rigid substrate arranged beneath the flexible substrate, and a plurality of elastic spacers that separate the flexible substrate from the rigid substrate that permit movement of the flexible substrate toward the rigid substrate to cause an oscillation of the portion of the surface layer. The oscillation of the portion of the surface layer is in a direction normal to the surface layer.

According to one embodiment of the tactile feedback actuator, the tactile feedback further includes a flexible substrate containing the electrode array including the first and second electrodes, a common ground electrode formed on a rigid substrate arranged beneath the flexible substrate, and an electro-active polymer (EAP) layer between the flexible substrate and the rigid substrate that permits movement of the flexible substrate toward the rigid substrate to cause an oscillation of the portion of the surface layer. The oscillation of the portion of the surface layer is in a direction normal to the surface layer.

Another aspect of the invention is a combined touch panel and tactile feedback device that includes a touch panel and the described tactile feedback actuator.

Another aspect of the invention is a touch-screen device that includes the described tactile feedback actuator, a display unit, a display controller configured to generate an output image on the display unit, a touch panel associated with the display unit, and a touch panel controller configured to apply stimulus signals to the touch panel and measure output signals from the touch panel. When the touch panel controller detects a user input to the touch panel at a corresponding location of the display unit associated in with a tactile sensation, the touch panel controller provides a voltage stimulus to the tactile feedback actuator to generate a tactile sensation on the touch panel at the location of the user input.

Another aspect of the invention is a method of providing tactile feedback to a touch surface. The method includes the steps of providing a first electrode and a second electrode separated by a gap; a providing a surface layer above the first and second electrodes, stimulating the first electrode with a first stimulus voltage at a first frequency, stimulating the second electrode with a second stimulus voltage at a second frequency, and superimposing the first and second stimulus voltages to generate a total voltage that has a beat frequency less than a perception threshold frequency, wherein the beat frequency is within a range to generate a tactile sensation at a portion of the surface layer.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

Figure 1:
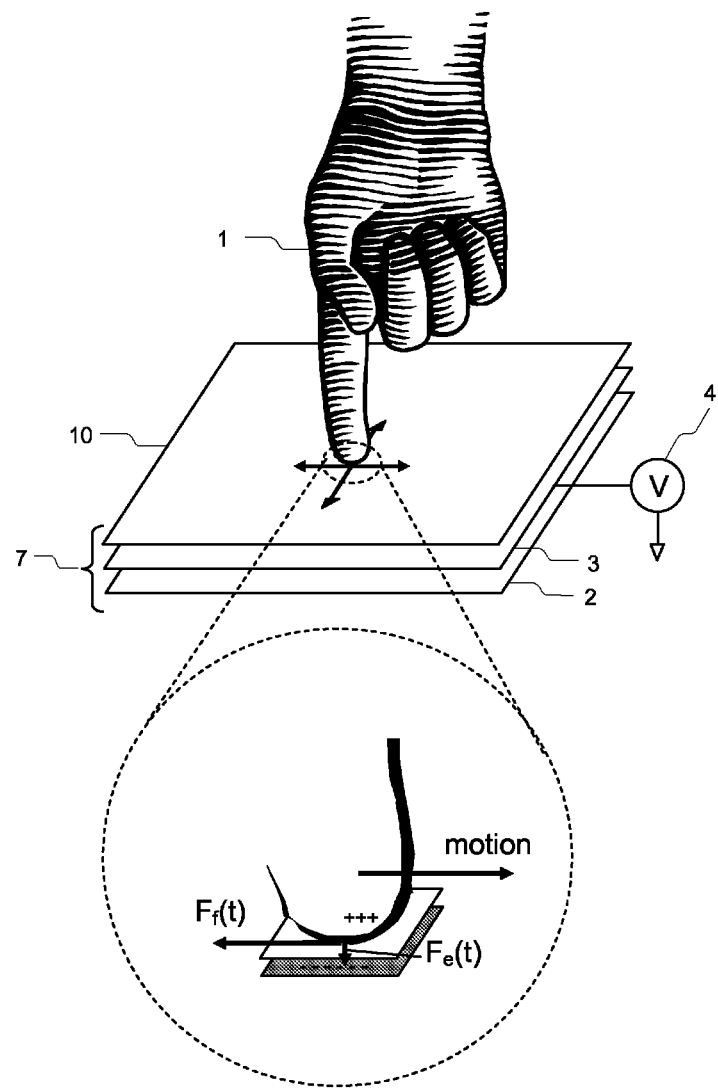
FIG. 1 shows a conventional electro-vibration actuator.

DESCRIPTION OF REFERENCE NUMERALS 1 user
2 conductive layer
3 insulating layer
4 power supply
7 tactile feedback device
10 device surface
11 left electrode
12 right electrode
15 electrode gap
16 region of superposition
20 tactile feedback actuator
21 column electrodes
22 column electrode segments
23 row electrode
24 row electrode segments
30 first conductive layer
31 second conductive layer
32 first insulating layer
33 second insulating layer
34 substrate
50 electrode array
51 column electrode
52 column electrode segment with fingers
53 row electrode
54 row electrode segment with fingers
70 electrode array
71 first conductive layer
72 second conductive layer
73 third conductive layer
74 first insulating layer
75 second insulating layer
76 third insulating layer
81 column electrode
82 column electrode segment in diamond shape
83 row electrode
84 row electrode segment in diamond shape
85 averaging electrode
100 combined touch panel transducer and tactile feedback actuator
101 column electrode
102 column electrode segment
103 row electrode
104 row electrode segment 110 column electrode multiplexer circuit
111 column multiplexer switch
112 actuator column signal line
113 touch panel drive signal line
114 multiplexer control signal
120 row electrode multiplexer circuit
121 row multiplexer switch
122 actuator row signal line
123 touch panel sense signal line
125 touch panel controller
130 electrode array
131 first flexible substrate
132 ground electrode
133 second rigid substrate
134 elastic spacers
135 column electrodes in first conductive layer
136 row electrodes in second conductive layer
137 first insulator layer
138 second insulator layer
140 electro-active polymer layer
200 haptic touch-screen device
201 display controller
202 display unit
203 touch panel controller
204 touch panel
205 tactile controller
206 tactile feedback actuator
207 host device

DETAILED DESCRIPTION OF INVENTION

Referring to FIG. 1, tactile feedback sensations may be created by generating vibrations in the skin of a user's finger. These vibrations may be created by the electro-vibration method. A touch feedback device 7 capable of generating tactile feedback sensations by the electro-vibration method is shown in FIG. 1 and includes a conductive layer 2 and insulating layer 3 that are located beneath a surface layer 10. A voltage signal generator 4 may be attached to the conductive layer 2 and used to apply a time-varying high voltage signal. This time-varying high voltage signal may be periodic in nature, for example a sinusoid, square wave, or triangular wave. When a user 1 touches the surface layer 10 of the tactile feedback device, the skin of the finger touching the surface 10 will experience a periodically varying attractive electrostatic force $F_e(t)$ towards the surface. This varying attractive force may cause vibrations in the users skin that are directly perceived by the user as a tactile sensation or, alternatively, may result in the modulation of a frictional force $F_f(t)$ the user experiences as the finger is moved across the surface of the device. The user may perceive the varying frictional force as tactile sensations similar to those that would be created by physical texture of an irregular surface, such as for example protrusions, depressions, edges and the like as may be present in a non-touch-screen input device.

Figure 2:
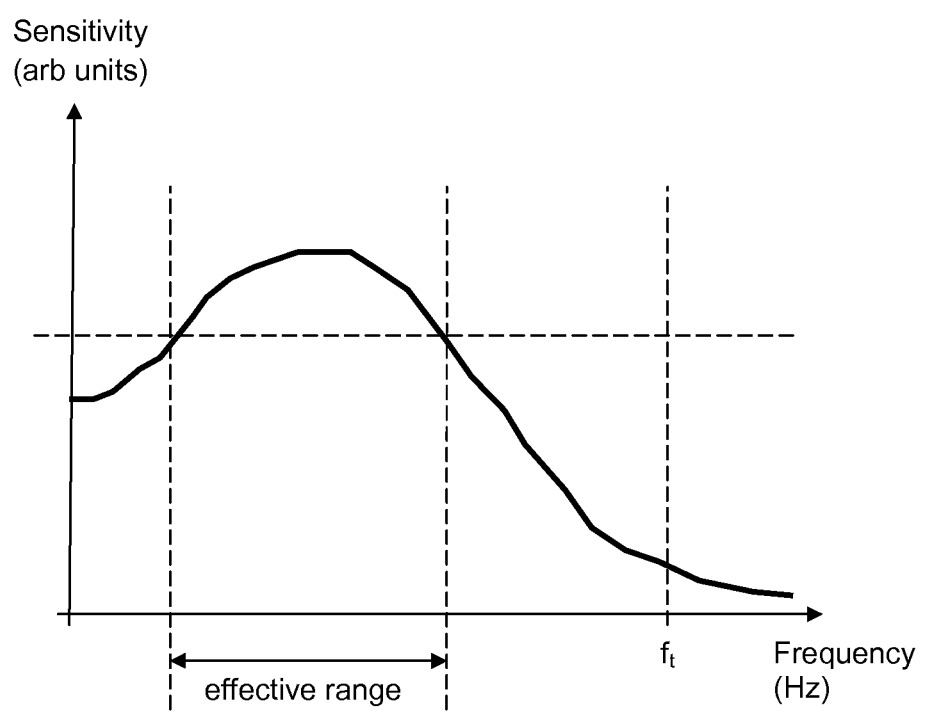
FIG. 2 shows the frequency response of the human touch sense to small vibrations of fixed amplitude.

As shown in FIG. 2, the human skin exhibits a frequency dependent sensitivity to vibration and hence to the applied time-varying signal. The applied time-varying signal is known to be the most effective in reproducing realistic tactile sensations when it has a frequency in the range of 20 Hz-1 kHz. In particular, the range of approximately 50-300 Hz corresponds to the frequency at which mechanoreceptors in the skin are most sensitive. Above a frequency threshold, $f_p$ of approximately 1 kHz, the skin is relatively insensitive to the generated vibrations and the user does not perceive any tactile sensation. The vibratory or oscillatory motion of the skin may be characterized by its amplitude, phase, force, waveform, cycle duration and number of cycles. These may be controlled by the applied time-varying signal to generate a particular tactile sensation, sequence of tactile sensations or perceived tactile effect. In conventional configurations as described above, application of an oscillating voltage to the conductive layer 2 creates the same tactile sensations across the entire surface of the device. Thus, undesirably, multiple objects touching the surface of the device all perceive the same sensation. The present invention overcomes such deficiencies.

In accordance with an exemplary embodiment of the present invention, an electro-vibration type tactile feedback device is provided that is capable of generating independent tactile feedback sensations at specific and multiple locations across the surface of the device. The tactile feedback device includes a tactile feedback actuator, which further includes an array of electrodes patterned into rows and columns and a means of applying time-varying high voltage signals of defined frequency to the electrodes in the electrode array. The applied signals may be arranged individually such that any signal alone does not generate a perceptible tactile sensation, and arranged in pairs such that combined the electrodes may produce a perceptible tactile signal. The principle of operation of such an arrangement is described herein.

In particular, the principle of superposition provides that the net response at a given location and time caused by multiple stimuli is the sum of the responses which would have been the result of each stimulus individually. If two sinusoidal waveforms of frequencies $f_1$ and $f_2$ each with amplitude y are combined, then their resultant amplitude as a function of time (ignoring phase offsets) will be $$y(t)=2y \cos [(f_1-f_2)\pi t] \sin [(f_1+f_2)\pi t].$$

Figure 3:
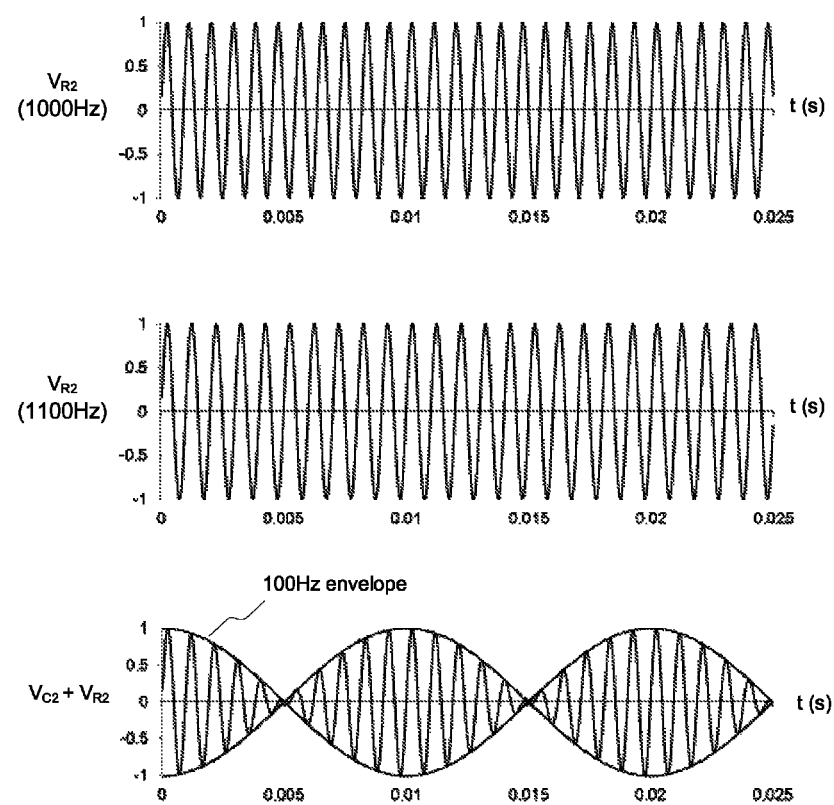
FIG. 3 shows a waveform diagram illustrating the principle of superposition of two waves to create a beat frequency.

A first frequency component $f_{carrier}=(f_1+f_2)/2$ is the average of the two frequencies, herein referred to as the carrier frequency. A second frequency component $f_e=(f_1-f_2)/2$ is half the difference between the two signals. The total signal oscillates with twice the frequency $f_e$, which is referred to herein as the beat frequency $\Delta f=(f_1-f_2)$. If $\Delta f$ is small compared to $f_1$ and $f_2$, then the waves superimpose as shown in FIG. 3. Since the human skin is insensitive to oscillations of frequency greater than the perception threshold frequency, $f_t$ (approximately 1 kHz), if the applied high voltage signals have sinusoidal waveforms $f_1$ and $f_2$ that are of a frequency greater than this perception frequency (for example, 1000 Hz and 1100 Hz respectively), then the oscillations of the skin generated by these individual applied signals will not be perceived. However, if the two high voltage signals generate oscillations that are a superposition of both sinusoids and the resultant beat frequency, $\Delta f$, (for example, 100 Hz) is less than the perception threshold, then oscillations at this beat frequency will be perceived. The superposition principle applies to any periodic waveform, and the applied voltage signals are therefore not limited to sinusoids but may be square, triangular or any arbitrary periodic waveform.

Figure 4:
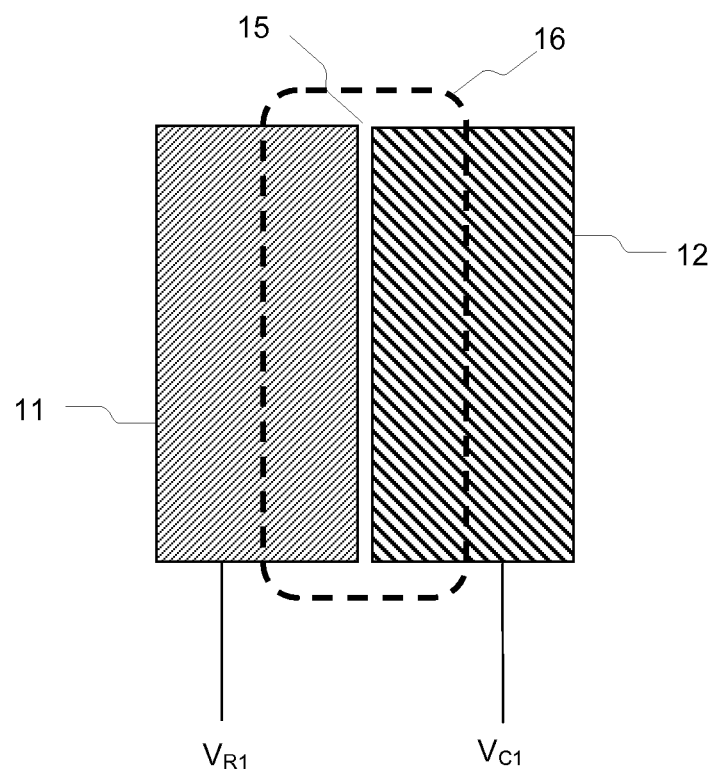
FIG. 4 shows an exemplary simple electrode arrangement for a tactile feedback device in accordance with embodiments of the present invention.

The application of these high voltage signals to create vibrations of the user's skin is now described. Referring to FIG. 4, in exemplary embodiments a tactile feedback actuator includes a first electrode 11 and a second electrode 12 formed in the conductive layer 2 that are arranged adjacent to each other and separated by an electrode gap 15. The skin on the human fingertips has a mechanical tactile resolution of approximately 2 mm. That is to say, a human can typically detect two separate points of applied pressure 2 mm apart but usually cannot distinguish between two points of applied pressure closer than 2 mm. Provided that the electrode gap 15 is less than this tactile resolution of about 2 mm, the user cannot distinguish the electrode gap.

In a first mode of operation, stimulus voltage waveforms $V_{R1}$ and $V_{C1}$ of frequency 1000 Hz are applied to the first and second electrodes 11, 12 respectively. Oscillations in the skin of user's finger of frequency 1000 Hz will therefore be generated above by both electrodes by the resulting electro-static attraction between the electrodes and the skin. Since this frequency is above the perception threshold, the user does not perceive any tactile sensation. Alternatively, in a second mode of operation, a first stimulus voltage waveform of first frequency $f_1$=1000 Hz is applied to the left electrode 11 and a second stimulus waveform of second frequency, $f_2$=1100 Hz (i.e. $\Delta f$=100 Hz) is applied to the right electrode 12. The superposition of applied voltage signals is strongest at the adjacent edges of the electrode segments and is reduced with distance from the adjacent edges. Thus, in region 16 close to the electrode gap 15, the finger perceives the beat component, $\Delta f = f_2 - f_1 = 100$ Hz, of the superimposed signal. Furthermore, the perceived strength of tactile sensation decreases away from the electrode gap such that as the finger moves away from the region 16 to a distance approaching the tactile resolution of the finger (approximately 2 mm), the user does not experience the superimposed signal and perceives no tactile sensations.

In accordance with the above features, therefore, a tactile feedback actuator generally includes a first electrode 11 and a second electrode 12 separated by a gap 15, and a surface layer 10 (see, e.g., FIG. 1) above the first and second electrodes. The first electrode receives a first stimulus voltage at a first frequency and the second electrode receives a second stimulus voltage at a second frequency, and the first and second electrodes are arranged such that the first and second stimulus voltages superimpose to generate a total voltage that has a beat frequency less than a perception threshold frequency. The beat frequency is within a range to generate a tactile sensation at a portion of the surface layer.

Figure 5A:
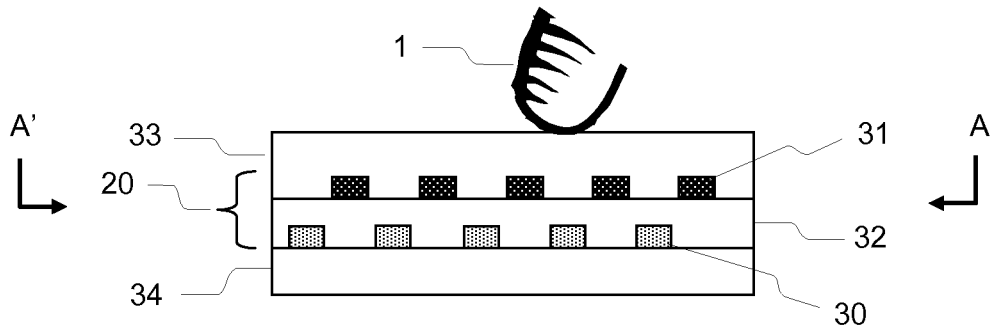
FIG. 5A shows a cross-section view of an exemplary electrode array in accordance with embodiments of the present invention.
Figure 5B:
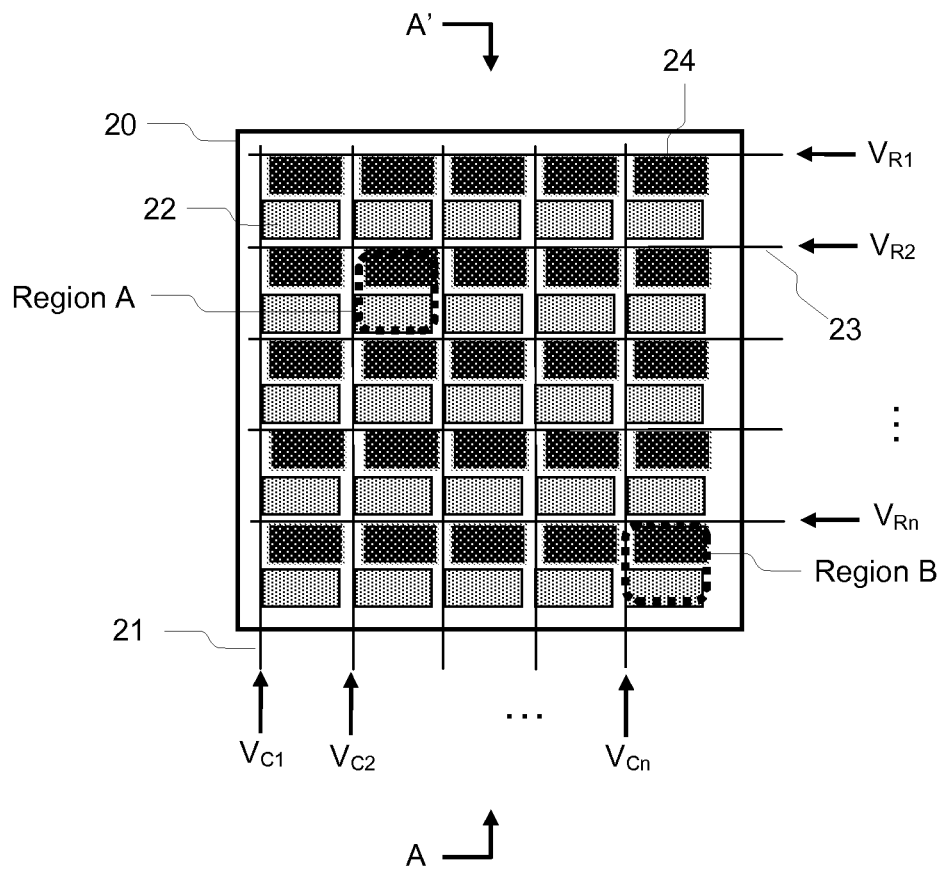
FIG. 5B shows a plan view of the exemplary electrode array of FIG. 5A.

As shown in FIG. 5B, this principle of superposition may be extended to an array of electrodes arranged in rows and columns. In exemplary embodiments, the first electrode includes a plurality of column electrodes that each includes a plurality of column electrode segments, and the second electrode includes a plurality of row electrodes that each includes a plurality of row electrode segments. As further explained below, the beat frequency is within a range to generate a tactile sensation at a portion of the surface layer above one or more of the column and row electrode segments.

As shown in FIG. 5B, for example, an electrode array 20 is made up of a matrix of column electrodes 21 and row electrodes 23. Each column electrode is formed by a series of interconnected column electrode segments 22. Each column electrode may be uniquely addressed with its own voltage stimulus signal ($V_{C1}$, $V_{C2}$ ... $V_{Cm}$). Similarly, each row electrode is formed by a series of interconnected row electrode segments 24, and each row electrode may be uniquely addressed with its own voltage stimulus signal ($V_{R1}$, $V_{R2}$ ... $V_{Rn}$). In this manner, each column electrode and each row electrode is separately addressable with a respective voltage stimulus. The column electrode segments 22 and row electrode segments 24 may from a tessellating pattern. The column and row electrode segments 22, 24 may be of rectangular shape or of any other regular tessellating pattern, such as for example a diamond shape.

As shown in the cross-section diagram of FIG. 5A, the column electrodes may be formed in a first conductive layer 30 and the row electrodes may be formed in a second conductive layer 31. The first and second conductive layers may be separated from each other by a first insulating layer 32. A second dielectric insulator layer 33 separates the second conductive layer from the user 1 ensuring that no direct current reaches the user. The insulator layer 33 thus includes the surface layer of the device. The column and row electrodes 21, 23 may be formed in the first and second conductive layers 30, 31 by photo-lithographic or printing techniques as is well-known in the field of touch panel manufacturing. The first conducting layer may be formed on a substrate 34 such as glass, plastic or the like.

In an alternative arrangement, the column and row electrode segments may both be formed in the second conducting layer. In this case, the column interconnects may also be formed in the second conducting layer, but the row interconnects are formed in the first conducting layer (or vice-versa). The row interconnects are insulated from the column interconnects by the first insulating layer 32 such that they may cross each other without electrical contact at the intersection of each row and column. Contact holes may be formed, for example by standard photo-lithographic techniques, in the first insulating layer 32 to allow the row interconnects to connect the row electrode segments 24 together.

The operation of the electrode array 20 to generate tactile feedback occurs in general as follows. At least one column electrode receives a first stimulus voltage at a first frequency and at least one row electrode receives a second stimulus voltage at a second frequency. A region of tactile feedback is formed at an intersection of the column electrode that receives the first stimulus voltage and the row electrode that receives the second stimulus voltage such that the first and second stimulus voltages superimpose within the region to generate a first total voltage that has a first beat frequency. The first beat frequency is within a range to generate a tactile sensation at a portion of the surface layer above the intersecting region.

Referring to FIG. 5B, for example, the operation of the electrode array 20 to generate independent tactile feedback locations at two separate locations—marked as first Region A and second Region B in FIG. 5B—is now described. First, to create a tactile sensation at the first Region A which is located, for example, at the intersection of the second column and the second row, a first stimulus voltage signal, $V_{C2}(f_{C2})$, is applied to the corresponding column electrode 21, and a second stimulus voltage signal, $V_{R2}(f_{R2})$, is applied to the corresponding row electrode 23. The first stimulus voltage signal $V_{C2}$ is of magnitude $V_{C2}$ and frequency $f_{C2}$. The second stimulus voltage signal $V_{R2}$ is of magnitude $V_{R2}$ and frequency $f_{R2}$. Here $|V_{C2}|=|V_{R2}|$ and $f_{C2}+\Delta f=f_{R2}$ with $\Delta f<f_{R2}$, $f_{C2}$. The area marked Region A indicates where at least one of the column electrode segments 22 of the second column and at least one of the row electrode segments 24 the second row are adjacent. Only in this region can the user 1 experience tactile sensations, since they feel oscillations at the beat frequency $\Delta f$ of these two signals. Outside of this region, the oscillations generated in the user's skin are above the perception threshold frequency.

Second, to create a tactile sensation at the second area marked Region B, which is located at the intersection of the mth column and nth row, a third stimulus voltage signal, $V_{Cm}$, is applied to the mth column and a fourth stimulus voltage signal, $V_{Rn}$, is applied to the nth row. The third stimulus voltage signal $V_{Cm}$ is of magnitude $V_{Cm}$ and frequency $f_{Cm}$. The fourth stimulus voltage signal $V_{Rn}$ is of magnitude $V_{Rn}$ and frequency $f_{Rn}$. Again, $|V_{Cm}|=|V_{Rn}|$ and $f_{Cm}+\delta f=f_{Rn}$ with $\delta f<f_{Rn},f_{Cm}$. The result is that the second Region B now also has a detectable tactile signal which may or may not be identical to that of Region A depending on whether the beat frequencies used are different, i.e. whether $\Delta f=\delta f$. In other words, the first and third, and/or the second and fourth, frequencies may differ such that a first beat frequency Δf differs from a second beat frequency δf.

The remaining row electrodes and column electrodes may be connected to a fixed potential, such as the ground potential. Accordingly, the user feels localized tactile sensations only where the signals applied to the column and row electrodes can superpose to create beating frequencies, i.e. only in Region A and Region B.

In accordance with another exemplary embodiment of the present invention, the strength of the tactile feedback sensation is increased through the use of inter-digitated electrode segments. As described above, the superposition of applied voltage signals is strongest at the adjacent edges of the electrode segments and is reduced with distance from the adjacent edges. It is therefore desirable to increase the length of the adjacent edges to increase the uniformity of the tactile sensations across the electrode segment while maintaining the total area of the electrode segments to retain the strength of the feedback sensation. To achieve such enhanced tactile sensation, each column electrode segment and each row electrode segment may include multiple fingers such that each column electrode segment is inter-digitated with a respective row electrode segment.

Figure 6:
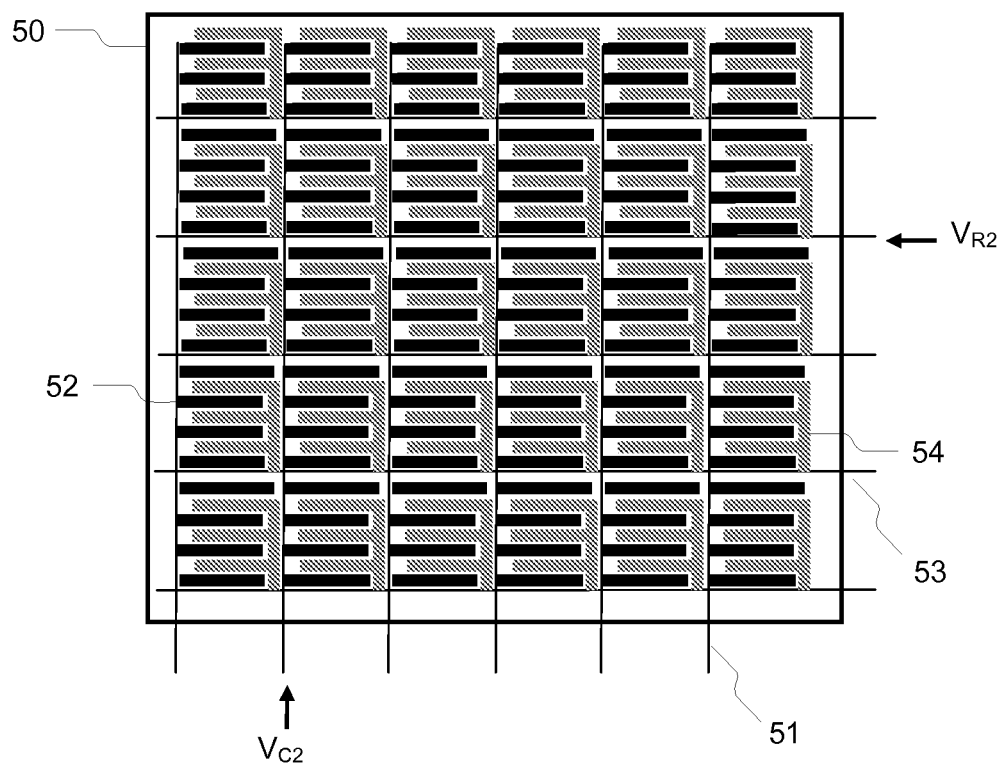
FIG. 6 shows another exemplary electrode array in accordance with embodiments of the present invention.

As illustrated in FIG. 6, for example, inter-digitated electrode segments may be achieved to fulfill the above enhanced feedback sensation. The electrode array 50 of the present embodiment includes a matrix of column electrodes 51 and row electrode 53. The column electrodes 51 are formed by a series of interconnected column electrode segment 52 wherein each segment contains multiple fingers.

Similarly, the row electrodes 53 are formed by a series of interconnected row electrode segments 54 wherein each segment contains multiple fingers. The outline shape of the row and column electrode segments 51, 53 may be rectangular, diamond-shaped or any other regular tessellating pattern. The fingers of the column and row electrode segments 51, 53 at each intersection of column electrode 50 and row electrode 52 may be arranged to tessellate (inter-digitated). The edges of the row and column electrode segments 51, 53 are extended throughout the entire area of the segments and a uniform tactile sensation is perceived by the user across the intersection area.

An alternative configuration for increasing the uniformity of the tactile feedback sensations perceived by the user is provided in accordance with another exemplary embodiment of the present invention by an electrode array structure including a third conductive layer having an array of averaging electrodes. Generally, each averaging electrode overlaps at least one column electrode segment and one row electrode segment, and the averaging electrode generates an averaging voltage by superimposing the first and second voltages to generate the total voltage at the beat frequency. The beat frequency is within a range to generate a tactile sensation at a portion of the surface layer above the averaging electrode.

Figure 7A:
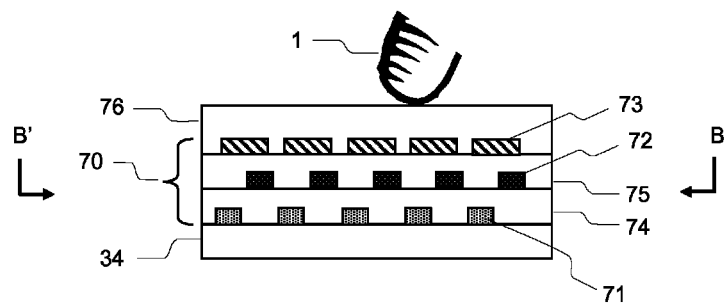
FIG. 7A shows a cross-section view of another exemplary electrode array in accordance with embodiments of the present invention.

As shown in FIG. 7A, for example, the electrode array 70 includes first to third conductive layers 71, 72, 73, a first insulating layer 74 between the first and second conductive layers 71, 72, a second insulating layer 75 between the second and third conductive layers 72, 73, and a third insulating layer 76 on top of the third conductive layer 73. The electrode array is formed on a substrate 34.

Figure 7B:
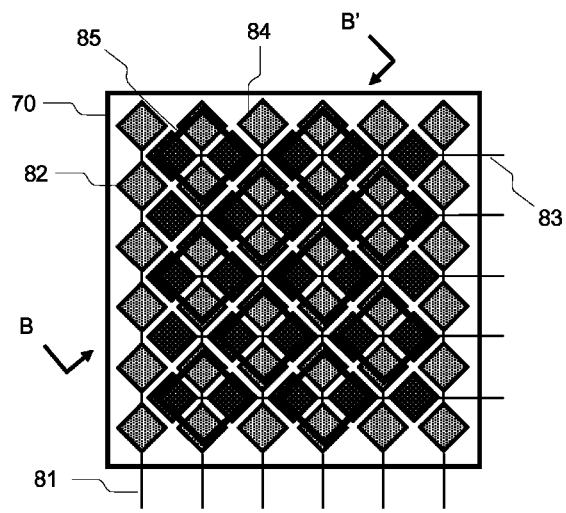
FIG. 7B shows a plan view of the exemplary electrode array of FIG. 7A.

As shown in FIG. 7B, for example, the electrode array 70 includes a matrix of column electrodes 81 and row electrodes 83. The column electrodes 81 are formed by a series of interconnected column electrode segments 82 wherein each segment may be of a regular shape, such as for example a diamond shape as is shown in FIG. 7B. Similarly, the row electrodes 83 are formed by a series of interconnected row electrode segments 84 wherein each segment may be of a regular pattern similar to that of the column electrode segments 82. The column electrode 81 and row electrodes 83 are arranged such that the column electrode segments 82 and row electrode segments 84 tessellate. The electrode array further includes a matrix of averaging electrodes 85. The shape of the averaging electrodes is chosen such that one averaging electrode 85 overlaps, preferably fully, at least one column electrode segment 82 of one column electrode 81 and one row electrode segment 84 of one row electrode 83. For example, in the arrangement illustrated in FIG. 7B, each averaging electrode 85 overlaps two adjacent column electrode segments 82 and two adjacent row electrode segments 84. The column and row electrodes 81, 83 may be formed in the first and second conductive layers 71, 72, and the averaging electrodes 85 may be formed in the third conductive layer 73 depicted in FIG. 7A. Each averaging electrode 85 therefore forms a first capacitor with the column electrode 81 it overlaps, and a second capacitor with the row electrode 83 it overlaps.

In this regard, the averaging electrodes 85 are electrically floating and form a capacitive divider between the column electrode segments and row electrode segments its overlaps. In operation the potential voltage of an averaging electrode is therefore given by:

$$V_A = (V_C \cdot C_{CA} + V_R \cdot C_{RA})/(C_{CA} + C_{RA})$$

where $V_A$ is the voltage on the averaging electrode; $V_C$ is the voltage applied to the column electrode; $V_R$ is the voltage applied to the row electrode; $C_{CA}$ is the capacitance of the capacitor formed between the averaging electrode and the column electrode segments it overlaps; and $C_{RA}$ is the capacitance of the capacitor formed between the averaging electrode and the row electrode segments it overlaps.

The voltage signal that is formed on the averaging electrode is therefore a superposition of the voltage signals applied to the column and row electrodes. Since the averaging electrode is located above the column and row electrodes, the voltage signal on an averaging electrode may generate oscillations in the skin of a user touching the surface of the tactile feedback device directly above that averaging electrode. Consequently, when the voltage signals applied to the column electrode and row electrode corresponding to the averaging electrode are such that they superpose to create a beat frequency, as described previously, oscillations at the beat frequency will be perceived by the user as tactile sensations. Furthermore, since the entire area of one averaging electrode is at the same potential voltage, the user will perceive the same tactile sensation across that area. The uniformity of tactile feedback sensations generated by the tactile feedback device is therefore improved.

Figure 8:
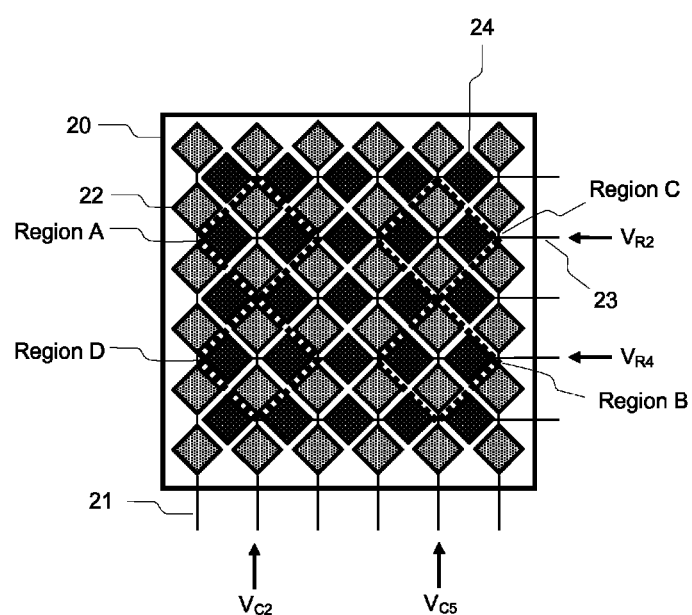
FIG. 8 illustrates an exemplary method of operating a tactile feedback actuator in accordance with embodiments of the present invention.

A possible result of the previous embodiments is the potential generation of unwanted "ghost regions" when tactile sensations are required to be generated at multiple locations on the surface of the device. The issue of ghost regions is illustrated in FIG. 8, for the case of independent tactile sensations generated at two separate locations. In the manner described above, for example, a first tactile sensation is generated at the area marked as Region A and a second tactile sensation is generated at the area marked as Region B. Accordingly, to generate tactile stimulation at Region A, the second column electrode has a stimulus voltage waveform of $V_{C2}(f_{C2})$ applied to it and the second row electrode has a stimulus voltage waveform of $V_{R2}(f_{R2})$ applied to it. Furthermore, to generate a tactile stimulation at Region B, the fifth column electrode has a stimulus voltage waveform of $V_{C5}(f_{C5})$ applied to it and the fourth row electrode has a stimulus voltage waveform of $V_{R4}(f_{R4})$ applied to it. However, in the area marked as Region C, the stimulus voltage waveforms $V_{C2}(f_{C2})$ and $V_{R4}(f_{R4})$ superimpose and create an undesirable tactile stimulation here. Likewise, in the area marked as Region D, the stimulus voltage waveforms $V_{C5}(f_{C5})$ and $V_{R2}(f_{R2})$ superimpose to create another undesirable tactile stimulation here. Thus, by the same principles that enabled a signal that is perceptible to the user to be generated in Regions A and B, perceptible signals may spuriously be generated in Regions C and D also. If any part of the user's skin is touching the surface of the device in Regions C and D, then these spurious signals may be perceived as unwanted tactile sensations.

FIG. 8 depicts another of embodiment of the present invention, in which the problem of ghost regions is avoided. More specifically, ghost regions are avoided through the application of pairs of stimulus voltage waveforms, wherein the signals within a pair superimpose to create a beat frequency below the perception threshold frequency but signals of different pairs superimpose to create only frequencies above the perception threshold. The signals applied to any active column may be of a frequency, $f_c$, given by $$f_c = (f_t + \Delta f_{max}) \cdot N + \Delta f_N$$

where N is the nth intersection at which tactile stimulus is required; $f_t$ is the perception threshold frequency; $\Delta f_{max}$ is the maximum desired oscillation frequency for tactile stimulation; and $\Delta f_N$ is the desired oscillation frequency at that intersection. The signals applied to any active row may be of frequency, $f_r$, given by $$f_r = (f_t + \Delta f_{max}) N.$$

FIG. 8 depicts an example case where two independent tactile sensations are required at two separate locations. Assuming $f_t = 800$ Hz and $\Delta f_{max} = 200$ Hz, to create a tactile sensation at the intersection of the second column electrode and second row electrode, first and second stimulus voltage waveforms $V_{C2}$ of first frequency $f_{C2} = 1080$ Hz and $V_{R2}$ of second frequency $f_{R2} = 1000$ Hz are applied to the second column electrode and second row electrode respectively. A tactile sensation with oscillation frequency, $f_1 = 80$ Hz is therefore generated at Region A. Simultaneously, to create a tactile sensation at the intersection of the fifth column electrode and fourth row electrode, third and fourth stimulus voltage waveforms $V_{C5}$ of third frequency $f_{C5} = 2060$ Hz and $V_{R4}$ of fourth frequency $f_{R4} = 2000$ Hz are applied to the fifth column electrode and fourth row electrode respectively. A tactile sensation with oscillation frequency $f_2 = 60$ Hz is therefore generated at Region B.

Ghost regions are avoided is follows. Superposition of the voltage signal applied to the fifth column and second row occurs at Region C. However, the resulting beat frequency of these two signals is above the perception threshold ($f_{C5} - f_{R2} = 2060 - 1000 = 1060$ Hz$> f_t$), and thus is not detected by any of the user's skin that may be in contact with Region C. Similarly, superposition of the voltage signal applied to the second column and fourth row occurs at Region D. However, the resulting beat frequency of these two signals is above the perception threshold ($|f_{C2} - f_{R4}| = |1080 - 2000| = 920$ Hz$> f_t$), and thus also is not detected by any of the user's skin that may be in contact with Region D. In other words, a superposition of the first voltage and the fourth voltage, or a superposition of the second voltage and the third voltage, results in a total voltage that is greater than the perception threshold frequency. Although this example describes the generation of tactile sensations at only two separate locations, the method disclosed in the present embodiment may be extended to any number of separate locations by appropriate selection of the frequency of the applied signals.

Figure 9:
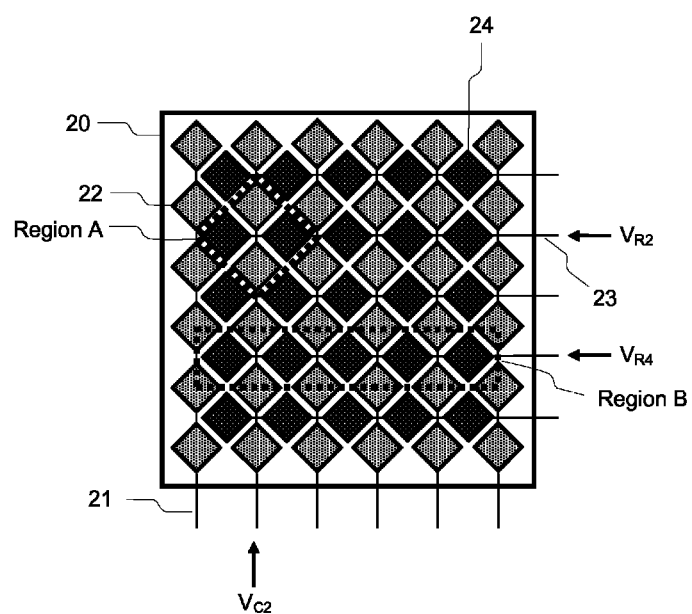
FIG. 9 illustrates another exemplary method of operating a tactile feedback actuator in accordance with embodiments of present the invention.

For some applications it may be desirable to apply a tactile sensation to a large area of the device surface, corresponding, for example, to an area across an entire row or column of the electrode array. Accordingly, FIG. 9 depicts an exemplary embodiment of the present invention in which applied voltage signals of frequency below the perception threshold may be applied to some row and/or column electrodes in conjunction with the application of voltage signals above the perception threshold to other rows and columns. The operating method of the present embodiment may be used in conjunction with the electrode array of any of the previous embodiments.

With reference to FIG. 9, the area indicated as Region A is an area of localized touch sensation that may be generated by the superposition methods described above. The area indicated as Region B, in contrast, covers an entire row and it is not necessary to use the superposition of signals to generate tactile sensations along this row. A signal of $f < f_t$ may therefore be applied to this row. In the example shown, a first stimulus voltage $V_{C2}$ with, for example, a frequency of $f_{C2} = 1000$ Hz may be applied to the second column electrode and a second stimulus voltage $V_{R2}$ with, for example, a frequency of $f_{R2} = 1050$ Hz may be applied to the second row electrode. A tactile sensation is therefore generated at Region A with oscillations in the user's skin of frequency 50 Hz. Simultaneously, an additional stimulus voltage $V_{R4}$ with, for example, a fifth frequency of $f_{R4} = 100$ Hz may be applied to applied to the fourth row electrode. The user may therefore perceive tactile sensations corresponding to oscillations in the user's skin of frequency 100 Hz at any point along this row. More generally, in this manner, a stimulus voltage having a frequency less than the perception threshold frequency is applied to at least one entire column electrode or of row electrode. The stimulus frequency is within a range to generate a tactile sensation at a portion of the surface layer above such column electrode or row electrode.

In the electro-vibration method employed in the aforementioned embodiments, the ground potential of the tactile feedback device and the user generally must be well defined. That is to say, the stimulus voltage applied to the electrode array of the tactile feedback device should create a difference in potential with respect to the user's skin for electro-static forces to be generated. If the potential voltage of the user's skin or the surface of the tactile feedback device is not fixed but is electrically floating at some indeterminate value, the potential difference between user and the tactile feedback actuator may be reduced. As a result, the electro-static forces generated by the device, the amplitude of the resulting oscillations in the user's skin, and the strength of the perceived tactile sensation will all be reduced. A common solution to these issues is to define a common "ground" potential between the tactile feedback device and the user by requiring the user to contact a grounding pad whilst using the device. The grounding pad may be connected to the tactile feedback device and located, for example, on the back surface of the device such that the user may hold the device in one hand, thereby establishing a common potential, while receiving stimulus from the device with the other hand. However, this method of providing a common ground places undesirable constraints on the design and usage of the tactile feedback device, which can result in spurious and unpleasant tactile sensations being generated on the hand holding the device.

Figure 10A:
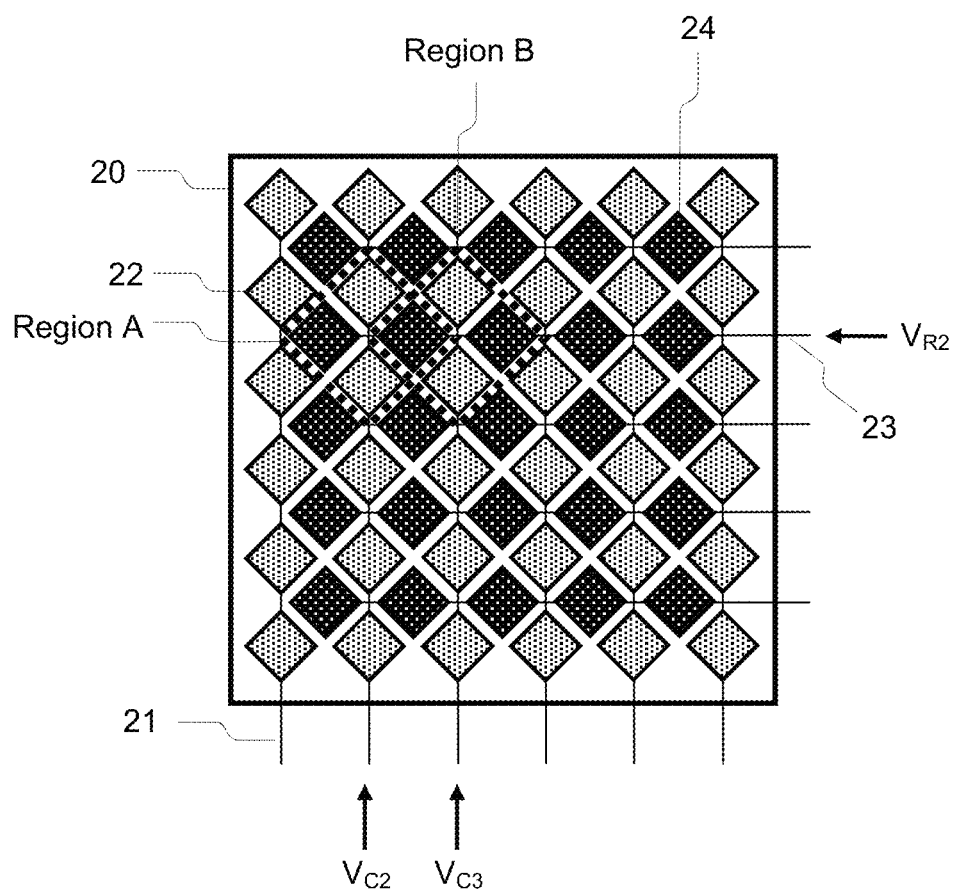
FIG. 10A shows a plan view of another exemplary tactile feedback actuator illustrating the operation of a tactile feedback device in accordance with embodiments of the present invention.

FIG. 10A depicts an exemplary embodiment of the present invention that addresses the above issues. In particular, stimulus voltages of opposite polarity (i.e. opposite phase or with a phase difference of 180 degrees) are applied to adjacent column (or row) electrodes in the electrode array to address the aforementioned common potential issues and thereby maximize the strength of the tactile sensation perceived by the user. The operation of a tactile feedback actuator in accordance with the present embodiment is now described, using the example as depicted in FIG. 10A.

Figure 10B:
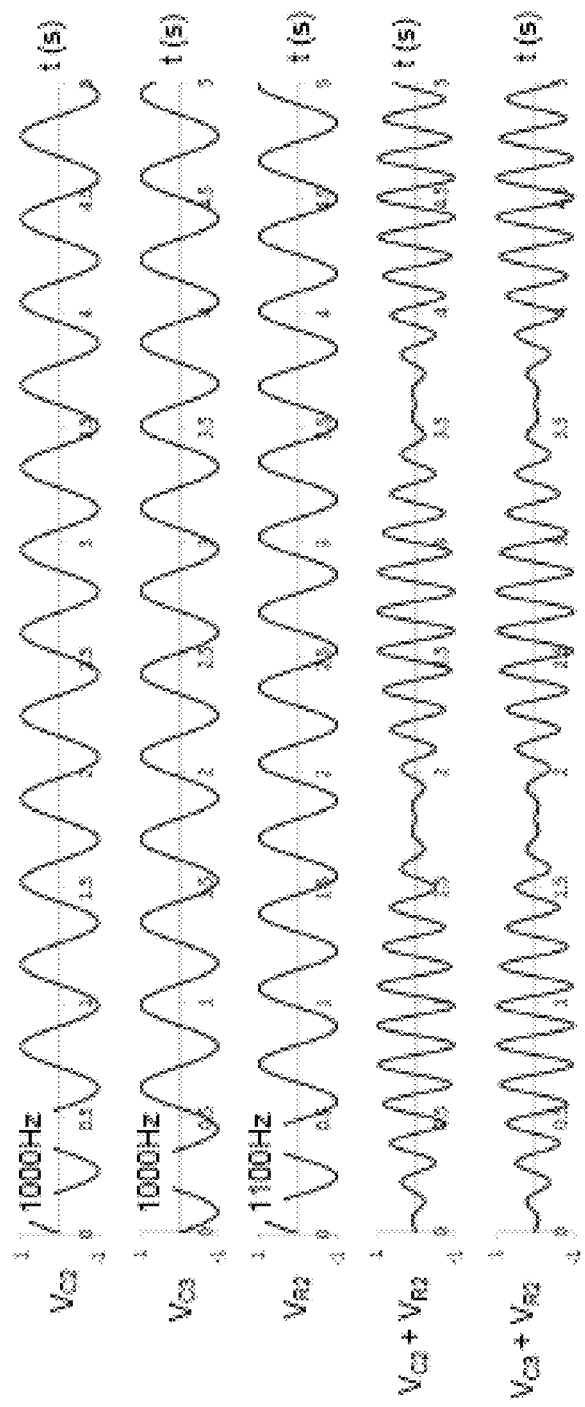
FIG. 10B shows example waveforms that may be applied to the tactile feedback actuator of FIG. 10A.

With reference to FIG. 10A, a first voltage stimulus signal, $V_{C2}$, is applied to the second column electrode, a second voltage stimulus, $V_{C3}$, is applied to the third column electrode, and a third voltage stimulus, $V_{R2}$, is applied to the second row electrode. As illustrated in FIG. 10B, the first voltage stimulus, $V_{C2}$, is a periodic waveform, for example a sinusoid, with a first frequency, $f_1$, above the perception threshold, $f_t$, and a first phase, $\phi_1$. The second voltage stimulus, $V_{C3}$, is a periodic waveform also with the frequency, $f_1$, but a second phase, $\phi_2$ that is of opposite phase and thus shifted 180 degrees with respect to the first phase, $\phi_1$. The third voltage stimulus is a periodic waveform of a second frequency, $f_2$, that is some deviation, $\Delta f$, from the first frequency, i.e. $f_2 = f_1 + \Delta f$. Accordingly there are two regions on the electrode array, denoted as Region A and Region B in FIG. 10A, where superposition occurs.

Since the beat component resulting from superposition is the same in both Region A and Region B, both regions will generate the same tactile sensation. However, since the high frequency component resulting from superposition of the first and third voltage stimulus has a phase difference of 180 degrees relative to the high frequency component resulting from superposition of the second and third voltage stimulus, the instantaneous potential at the user's skin in the area around the overlap of Region A and Region B will be fixed. That is to say, any charge injected from the electrode array to the user's skin due to capacitive coupling around Region A will be equal to any charge removed from the electrode array from the user's skin due to capacitive coupling around Region B. Accordingly, there exists a well-defined potential difference between the electrode array and the user's skin around Region A and Region B, thus enabling strong tactile sensations to be perceived.

In accordance with exemplary embodiments of the present invention, the electrode array is made of transparent materials allowing the tactile feedback device to be placed directly on top of a display, for example a liquid crystal display. A tactile feedback device may be used in conjunction with a display to provide a means of feeling the image shown on the display. For example, when a user touches the surface of the display, the tactile feedback device may be used to replicate the texture that would be felt when touching the actual object shown in the image of the display. In such a device, the electrodes of the touch feedback actuator may be made of transparent conductors, for example Indium-Tin-Oxide (ITO), or other similar materials common in the field of touch panel or liquid crystal display manufacturing. The electrodes can be patterned as required by standard lithographical processes. The transparent insulator may be a material, such as a plastic or ceramic material, with high transparency and sufficient dielectric strength to prevent breakdown through their bulk when high voltage signals are applied to the electrode array. For the upper dielectric, there are additional constraints that material must be thin (to maximize electrostatic forces generated) and durable, such as not to diminish the durability of the device surface. This surface can be additionally treated to make it scratch resistant, hydrophobic, oleophobic, or self-cleaning, etc. The substrate material upon which the tactile electrodes are deposited can be made of, for example, glass or plastic, or other suitable materials. The material selected should have a high resistance to surface electrical breakdown and can be treated such that it resists electrical breakdown up to very high voltages. Strict cleaning procedures before construction and some surface treatments or coatings may allow a breakdown strength in excess of 2 kV/mm to be achieved.

Alternatively or additionally, the tactile feedback device may be used in conjunction with a touch panel device. In this way, the user may interact with the surface of the device and activate tactile sensations through operation of the touch panel. For example, if the user presses a virtual button or key on the touch panel, the tactile feedback device may replicate the tactile sensations associated with pressing a physical button or key. More generally, if the user manipulates a virtual object using the touch panel device, the tactile feedback device may re-create specific tactile sensations associated with the manipulation of that object.

On many types of known touch panel devices, for example those based on optical, surface-acoustic waves or resistive methods, the aforementioned tactile feedback actuator may simply be added on top of the touch panel such that it lies between the touch panel and the user. However, for capacitive type touch panels it is not possible to simply add the tactile feedback device in this manner since it would interfere with the operation of the capacitive touch panel. Typically, capacitive touch panels operate by measuring the capacitance between a conductive layer embedded in the touch panel and a conductive object, such as a finger, in proximity to the surface of the touch panel. By adding the tactile feedback actuator between the touch panel and the conductive object, the electrodes of the electrode array of the tactile feedback device act as an electrical shield to the touch panel and thus prevent capacitance forming between the touch panel conductive layer and the conductive object to be detected.

To address such issues pertaining to a capacitive type touch panel, in accordance with exemplary embodiments of the present invention, the electrodes of the electrode array of the tactile feedback actuator of any of the previous embodiments are formed using weakly conductive layers. When added on top of a capacitive type touch panel, the tactile feedback device of the present embodiment does not therefore interfere with the operation of the touch panel. Since capacitive touch panels typically employ high frequency periodic signals to measure capacitance, typically in the range 100 kHz to 1 MHz, the high resistance of the electrodes mean that the tactile feedback actuator does not affect the capacitance measurement. The resistivity of the weakly conductive layer may be far higher than a metallic layer, for example in the range ~0.1 MOhm/sq. to 10 MOhm/sq. At such a value, although the high frequency signals used to measure capacitance are not attenuated by the tactile feedback actuator, the low frequency signals required for the generation of tactile sensations, typically in the range of 1 kHz-10 kHz, may still propagate along the electrodes of the electrode array of the tactile feedback actuator. Suitable materials for the fabrication of the transparent weakly conductive layer include metal-oxide conductors, such as Indium-Tin-Oxide (ITO) or Indium-Zinc-Oxide (IZO), metal-oxide semi-conductors, such as Indium-Gallium-Zinc-Oxide (IGZO), or a conductive polymer such as PEDOT or PANI.

Figure 11:
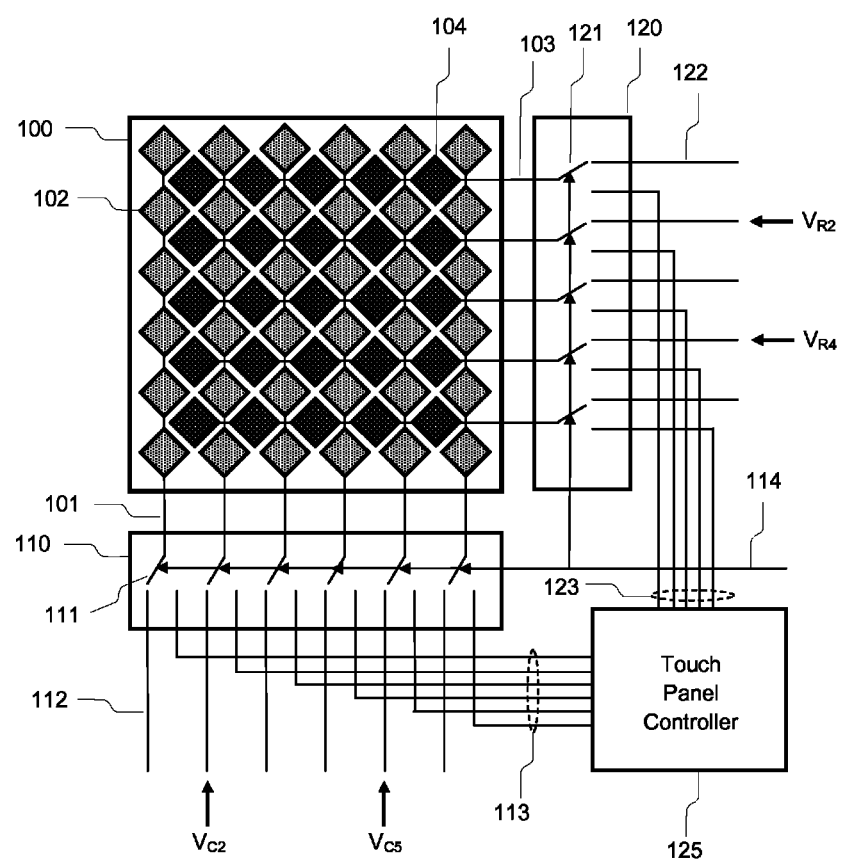
FIG. 11 shows a combined exemplary touch panel and tactile feedback electrode array in accordance with embodiments of the present invention.

A potential disadvantage of adding additional structures, such as a tactile feedback device or touch panel, on top of the surface of a display device is that the thickness and weight of the complete display module containing all of these devices is increased. Furthermore, even if the layers forming such additional structures are substantially transparent, unless they are perfectly optically matched to the display then there will be an increase in the magnitude of ambient light reflected from the surface of the display, and hence a decrease in the contrast of the display. FIG. 11 depicts an exemplary touch panel device in accordance with embodiments of the present invention that addresses such issues. In particular, the tactile feedback function and touch panel function are formed in the same structure. Such a combined touch panel and tactile feedback device is shown in FIG. 11.

As is known in the art, a capacitive touch panel may be formed by an orthogonal array of electrodes, wherein voltage stimulus signals are applied to the electrodes forming the rows of the array, and current measuring circuits are connected to the electrodes forming the columns of the array. The current measured in the measuring circuit upon application of a stimulus to any particular row is indicative of the capacitance associated with the intersection of that row and the column to which the measuring circuit is attached. The presence of an object near the intersection changes the capacitance and generates a measurable change in the output of the measuring circuit.

Referring to FIG. 11, an exemplary combined touch panel and tactile feedback device 100 includes column electrodes 101 formed by interconnected column electrode segments 102 and row electrodes 103 formed by interconnected row electrode segments 104. The combined device 100 may be operated in a first time period as a tactile feedback device and in a second time period as a touch panel device. A column multiplexer circuit 110 is connected to the column electrodes 101 and includes column multiplexer switches 111 that connect the column electrodes 101 to actuator column signal lines 112 during the first period and to touch panel drive (voltage stimulus) signals 113 during a second period. The operation of the switches 111 is controlled by a multiplexer control signal 114. A row multiplexer circuit 120 is connected to the row electrodes 103 and includes row multiplexer switches 121 that connect the row electrodes 103 to actuator row signal lines 122 during the first period and to touch panel sense (measuring) signals 123 during a second period. The operation of the switches 121 is controlled by the multiplexer control signal 114.

During the first period, voltage stimulus signals may be applied to the actuator row signal lines 112 and actuator column signal lines 113 as previously described to generate tactile feedback sensations at specific and multiple locations across the surface of the device. During the second period, the touch panel may operate as normal to measure the capacitances associated with each intersection in the electrode array. Since the touch panel signals are of lower voltage than the stimulus signals used to generate tactile feedback and have a frequency much higher that the detection threshold, $f_r$, no tactile sensations may be perceived due to the touch panel operation.

A known limitation of conventional electro-vibration methods is that the strength of tactile sensation perceived by a user's finger when stationary on the surface of the tactile feedback device is relatively weak compared to when in motion across the surface. The reproduction of realistic and strong static tactile sensations, such as those associated with the "click" of a button on a keyboard, is therefore difficult to achieve. However, in the present invention the electro-vibration method may be in conjunction with other methods of generating tactile feedback to create a device that can reproduce both realistic and strong tactile sensations both when the user's finger is static and when it is in motion across the surface of the device.

For example, it is known that tactile sensations may be generated by mechanical oscillation of the surface of a device in contact with a user's finger. Such mechanical oscillation may be generated by electrostatic attraction between a first substrate whose surface is in contact with the finger and a second substrate. Typically, a first electrode is formed on the lower surface of the first substrate, and a second electrode is formed on the upper surface of the second substrate. A first and second voltage stimulus may then be applied to the first and second electrodes respectively to generate an electric field and corresponding electrostatic force between the two substrates. With a suitable mechanical arrangement, the first substrate will therefore move toward the second substrate under the action of this electro-static force. Furthermore, periodic application of the voltage stimulus signals may cause oscillation of the first substrate relative to the second with the return force provided by, for example, elastic spacers arranged between the first and second substrates.

Figure 12:
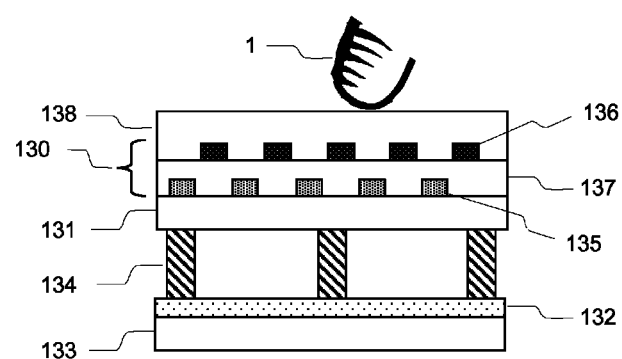
FIG. 12 shows an exemplary tactile feedback device in accordance with embodiments of the present invention.

FIG. 12 depicts an exemplary embodiment of the present invention in accordance with such features. In particular, a tactile feedback device is provided including a tactile feedback actuator with an electrode array and driving method to generate tactile sensations by the electro-static actuation method. Generally, such device includes a flexible substrate containing an electrode array including the first and second electrodes, and a common ground electrode formed on a rigid substrate arranged beneath the flexible substrate. A plurality of elastic spacers separate the flexible substrate from the rigid substrate that permit movement of the flexible substrate toward the rigid substrate to cause the oscillation of the pertinent portion of the surface layer. The oscillation of the pertinent portion of the surface layer is in a direction normal to the surface layer.

Referring to FIG. 12, the structure of such a tactile feedback device includes an electrode array 130 formed on a first flexible substrate 131, and a common ground electrode 132 formed on a second rigid substrate 133 arranged beneath the first substrate 131. The first and second substrates are separated by elastic spacers 134 that permit motion of the first substrate towards the second substrate. The electrode array may be arranged as a matrix of row and column electrodes as previously described in which the column electrodes 135 may be formed in a first conductive layer and the row electrodes 136 may be formed in a second conductive layer. The first and second conductive layers may be separated from each other by a first insulating layer 137. A second dielectric insulator layer 138 may separate and electrically isolate the second conductive layer 136 from the user 1. Alternatively, when the tactile feedback device is used in conjunction with a capacitive type touch panel, the ground electrode may be formed by the electrode array of the touch panel. Since the signals applied to the touch panel electrode array are of significantly lower voltage than those applied to the electrode array of the tactile feedback actuator, the touch panel electrode array may be considered as effectively a ground plane.

Voltage stimulus signals may be applied to the column and row electrodes 135, 136 of the electrode array 130 using a superposition method as previously described. A high voltage, low frequency beat signal is therefore generated in one or more specific regions at desired locations on the electrode array 130. In each of these regions an electric field is formed between the electrode array and the ground electrode 132, thus generating an electro-static force. Due to the time varying nature of the electric field, the strength of electro-static force will increase and decrease periodically. The magnitude of the voltage stimulus may be chosen such that at some time during each period the electro-static force is large enough to overcome the mechanical resistance of the elastic spacers 134 and first substrate 131. At this time, the first substrate 131 will therefore move towards the second substrate 132 in the region where the electric field exists. At other times during each period, the electro-static force is reduced below the return force provided by the elastic spacers 134 and first substrate 131. At such time the first substrate 131 will therefore move away the second substrate 132.

In this way, one or more specific regions of the first substrate 131 are caused to oscillate in a direction normal to the plane of the substrate surface, and the user 1 will perceive such oscillations as tactile sensations. An electric field is also generated between each column electrode 135 (or row electrode 136) to which a voltage stimulus is applied and the ground electrode 132. However, since the frequency of these individual voltage stimuli is higher than the perception threshold, $f_p$, any mechanical oscillations resulting from electro-static forces created by electric fields arising from these individual voltage stimuli will not be perceived as tactile sensations. Alternatively, the material of the elastic spacers 134 and/or the mechanical stiffness of the first flexible substrate 131 may be chosen such as to damp the high frequency oscillations of individual voltage stimuli, but permit low frequency oscillations resulting from superposition of the voltage stimuli in the selected regions.

Figure 13:
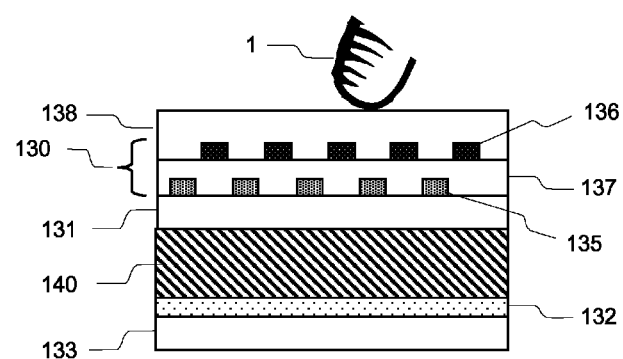
FIG. 13 shows another exemplary tactile feedback device in accordance with embodiments of the present invention.

FIG. 13 depicts another exemplary embodiment of the present invention, in which a tactile feedback device is provided in which mechanical oscillation is generated by an electro-active polymer (EAP). It is known that electro-active polymers contract or expand in response to the potential difference applied across them. A varying potential difference will cause oscillatory motion of the EAP and, if a layer of EAP material is constrained between two substrates, this oscillatory motion may be in the form of vibrations that are perceivable as tactile sensations to a user touching the surface of one of the substrates. The EAP may, for example, be an electronic type EAP such as a dielectric elastomer or electrostrictive polymer or an ionic type EAP such as an ionic polymer-metal composite. This embodiment is similar to that of FIG. 12, except that in the embodiment of FIG. 13, an electro-active polymer (EAP) layer is provided between the flexible substrate and the rigid substrate that permits movement of the flexible substrate toward the rigid substrate to cause the oscillation of the pertinent portion of the surface layer.

As shown in FIG. 13, for example, the structure of a tactile feedback device in accordance with the present embodiment is similar to that of the previous embodiment with the exception that a layer of electro-active polymer material 140 is used to separate the first flexible substrate 131 from the second rigid substrate 133. By applying voltage stimulus to the electrode array 130 using the superposition method of the present invention, the EAP layer may be made to vibrate at frequencies perceivable by the user at specific and multiple locations across the surface of the device. In using an EAP as compared to the electro-static method of the previous embodiment, the force generated by the EAP may be greater than the electro-static force with the result that more realistic tactile sensations may be generated. In addition, the EAP layer may be thinner and create vibration at a lower voltage than the electro-static method.

Figure 14:
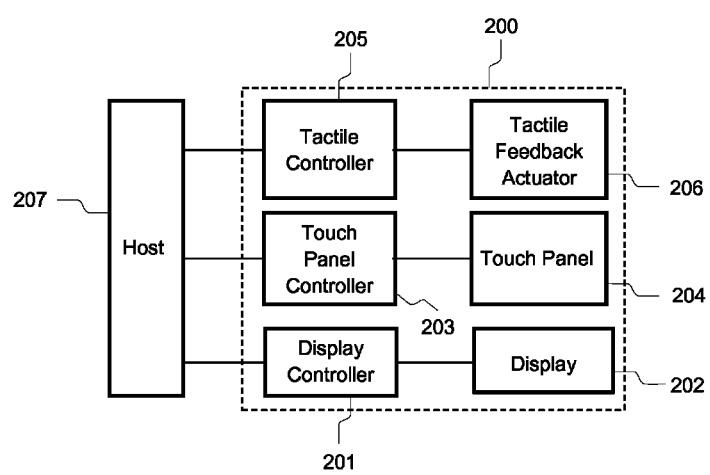
FIG. 14 shows an exemplary haptic touch-screen device in accordance with embodiments of the present invention incorporating a tactile feedback device of the present invention.

FIG. 14 depicts another exemplary embodiment of the present invention, in which the tactile feedback device is integrated with a touch panel and display device to form a haptic touch-screen device. FIG. 14 shows a system block diagram of a haptic touch-screen device 200 incorporating a tactile feedback actuator 206 in accordance with the present invention. The haptic touch-screen device 200 includes: a display controller 201 to generate an output image on a display unit 202; a touch panel controller 203 to apply stimulus signals to and measure output signals from a touch panel 204; and a tactile controller 205 to generate voltage stimulus signals and apply them to the tactile feedback actuator 206, which creates tactile sensations. A host device 207, for example a mobile phone, Tablet PC or the like, may coordinate the operation of the display controller 201, touch panel controller 203, and tactile feedback controller 201 as now described.

The haptic touch-screen device 200 displays an image on the display 202 that may include representations of virtual objects for the user to interact with, for example virtual buttons or the like. When a user touches the surface of the haptic touch-screen device 200, the touch panel controller 203 detects a change in the output of the touch panel 204 and determines the location of the touch using conventional techniques. The host device 207 determines whether the user has touched a region of the surface of the device corresponding to a virtual object that is associated with tactile sensations. When the user touches the surface of the haptic touch-screen device 200 in a region that is associated with tactile sensations (for example a virtual button or scroll-bar), the host device 207 signals the tactile controller 205 to activate the tactile feedback actuator 206 by providing voltage stimulus signals to the electrode array of the actuator 206. The tactile sensation is provided at only the specific location corresponding to the region in which the user has touched the surface of the device. If the user touches the surface of the haptic touch-screen device 200 at more than one point, for example with more than one finger, then the tactile controller 205 may apply voltage stimulus signals to generate tactile sensations at multiple and specific locations on the surface of the device. Alternatively, when the user presses the surface of the haptic touch-screen device 200 in a region that is not associated with tactile sensations, the tactile controller 205 does not take any action, the tactile feedback actuator 206 is inactive and no tactile sensations are generated.

Different tactile sensations may be associated with different types of virtual objects, for example buttons, scrollbars, keys or the like, and waveform patterns to reproduce the tactile sensations may be stored in the tactile controller 205 and applied to the tactile feedback actuator 206 as required. By appropriate control, over the waveform applied to the tactile actuator, a virtual touch sensation close to that of a physical object may be re-created. For example, when a user presses a virtual button on the touch-screen, the feeling of touching a physical keyboard can be re-created. As a result, user satisfaction is increased and data entry error rates are reduced.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The present invention finds applications in electronic products in which tactile feedback effects may be beneficial, such as mobile phones, PDAs, e-readers, navigational devices, Tablet PCs and the like. The tactile feedback device enables the user to feel on the surface of the device textures and sensations associated with physical structures. These tactile sensations may be provided in such a way as to improve the utility and usability of the device.

The invention claimed is:

1. A tactile feedback actuator comprising:
a first electrode and a second electrode separated by a gap; and
a surface layer above the first and second electrodes;
wherein:
the first electrode receives a first stimulus voltage at a first frequency and the second electrode receives a second stimulus voltage at a second frequency, and the first and second electrodes are arranged such that the first and second stimulus voltages superimpose to generate a total voltage that has a beat frequency less than a perception threshold frequency,
the beat frequency is within a range to generate a tactile sensation at a portion of the surface layer,
at least one of the first and second frequencies of the first and second stimulus voltages is greater than the perception threshold frequency,
the first electrode and the second electrode comprise an electrode array,
the first electrode comprises a plurality of column electrodes that each includes a plurality of column electrode segments, and the second electrode comprises a plurality of row electrodes that each includes a plurality of row electrode segments,
the beat frequency is within a range to generate a tactile sensation at a portion of the surface layer above one or more of the column and row electrode segments,
each column electrode and each row electrode is separately addressable with a respective voltage stimulus,
at least one column electrode receives the first stimulus voltage at the first frequency and at least one row electrode receives the second stimulus voltage at the second frequency,
a first region of tactile feedback is formed at an intersection of the column electrode that receives the first stimulus voltage and the row electrode that receives the second stimulus voltage such that the first and second stimulus voltages superimpose within the region to generate a first total voltage that has a first beat frequency, and
the beat frequency is within a range to generate a tactile sensation at a portion of the surface layer above the first region.

2. The tactile feedback actuator of claim 1, wherein the beat frequency is a difference between the first frequency and the second frequency.

3. The tactile feedback actuator of claim 1, wherein the perception threshold frequency is less than 1000 Hz.

4. The tactile feedback actuator of claim 1, wherein the gap is less than least 2 mm.

5. The tactile feedback actuator of claim 1, wherein the first region of tactile feedback includes at least one column electrode segment and one row electrode segment.

6. The tactile feedback actuator of claim 1, wherein at least one other column electrode receives a third stimulus voltage at a third frequency and at least one other row electrode receives a fourth stimulus voltage at a fourth frequency,
a second region of tactile feedback is formed at an intersection of the column electrode that receives the third stimulus voltage and the row electrode that receives the fourth stimulus voltage such that the third and fourth stimulus voltages superimpose within the second region to generate a second total voltage that has a second beat frequency, and
the second beat frequency is within a range to generate a tactile sensation at a portion of the surface layer above the second region.

7. The tactile feedback actuator of claim 6, wherein the second region of tactile feedback includes at least one column electrode segment and one row electrode segment.

8. The tactile feedback actuator of claim 6, wherein a superposition of the first voltage and the fourth voltage, or a superposition of the second voltage and the third voltage, results in a total voltage that is greater than the perception threshold frequency.

9. The tactile feedback actuator of claim 1, wherein each column electrode segment and each row electrode segment includes multiple fingers such that each column electrode segment is inter-digitated with a respective row electrode segment.

10. The tactile feedback actuator of claim 1, further comprising a plurality of averaging electrodes;
wherein each averaging electrode overlaps at least one column electrode segment and one row electrode segment, and the averaging electrode generates an averaging voltage by superimposing the first and second voltages to generate the total voltage at the beat frequency, and
the beat frequency is within a range to generate a tactile sensation at a portion of the surface layer above the averaging electrode.

11. The tactile feedback actuator of claim 1, wherein a fifth stimulus voltage having a fifth frequency less than the perception threshold frequency is applied to at least one other of the plurality of column electrodes or the plurality of row electrodes, and
the fifth frequency is within a range to produce a tactile sensation at a portion of the surface layer above the one other column electrode or row electrode.

12. The tactile feedback actuator of claim 1, wherein stimulus voltages applied to adjacent column electrodes or row electrodes are of opposite phase.

13. The tactile feedback actuator of claim 1, further comprising:
a flexible substrate containing the electrode array including the first and second electrodes;
a common ground electrode formed on a rigid substrate arranged beneath the flexible substrate; and
a plurality of elastic spacers that separate the flexible substrate from the rigid substrate that permit movement of the flexible substrate toward the rigid substrate to cause an oscillation of the portion of the surface layer,
wherein the oscillation of the portion of the surface layer is in a direction normal to the surface layer.

14. The tactile feedback actuator of claim 1, further comprising:
a flexible substrate containing the electrode array including the first and second electrodes;
a common ground electrode formed on a rigid substrate arranged beneath the flexible substrate; and
an electro-active polymer (EAP) layer between the flexible substrate and the rigid substrate that permits movement of the flexible substrate toward the rigid substrate to cause an oscillation of the portion of the surface layer, wherein the oscillation of the portion of the surface layer is in a direction normal to the surface layer.

15. A combined touch panel and tactile feedback device comprising:
- a touch panel; and
- the tactile feedback actuator of claim 1.

16. A touch-screen device comprising:
- the tactile feedback actuator according to claim 1;
- a display unit;
- a display controller configured to generate an output image on the display unit;
- a touch panel associated with the display unit; and
- a touch panel controller configured to apply stimulus signals to the touch panel and measure output signals from the touch panel;
- wherein when the touch panel controller detects a user input to the touch panel at a corresponding location of the display unit associated in with a tactile sensation, the touch panel controller provides a voltage stimulus to the tactile feedback actuator to generate a tactile sensation on the touch panel at the location of the user input.

17. A method of providing tactile feedback to a touch surface comprising the steps of:
- providing a first electrode and a second electrode separated by a gap;
- providing a surface layer above the first and second electrodes;
- stimulating the first electrode with a first stimulus voltage at a first frequency;
- stimulating the second electrode with a second stimulus voltage at a second frequency; and
- superimposing the first and second stimulus voltages to generate a total voltage that has a beat frequency less than a perception threshold frequency;

wherein:
- the beat frequency is within a range to generate a tactile sensation at a portion of the surface layer,
- at least one of the first and second frequencies of the first and second stimulus voltages is greater than the perception threshold frequency,
- the first electrode and the second electrode comprise an electrode array,
- the first electrode comprises a plurality of column electrodes that each includes a plurality of column electrode segments, and the second electrode comprises a plurality of row electrodes that each includes a plurality of row electrode segments,
- the beat frequency is within a range to generate a tactile sensation at a portion of the surface layer above one or more of the column and row electrode segments,
- each column electrode and each row electrode is separately addressable with a respective voltage stimulus,
- at least one column electrode receives the first stimulus voltage at the first frequency and at least one row electrode receives the second stimulus voltage at the second frequency,
- a first region of tactile feedback is formed at an intersection of the column electrode that receives the first stimulus voltage and the row electrode that receives the second stimulus voltage such that the first and second stimulus voltages superimpose within the region to generate a first total voltage that has a first beat frequency, and
- the beat frequency is within a range to generate a tactile sensation at a portion of the surface layer above the first region.

* * * * *